US005249346A

United States Patent [19]

Kohler

[11] Patent Number: 5,249,346

[45] Date of Patent: Oct. 5, 1993

[54] PROCESS AND APPARATUS FOR FIXING HOLDING CLIPS TO A BAND

[76] Inventor: Wolfgang Kohler, Westring 55, D-6108 Weiterstadt, Fed. Rep. of Germany

[21] Appl. No.: 790,409

[22] Filed: Nov. 7, 1991

[51] Int. Cl.[5] .............................................. B23P 11/02

[52] U.S. Cl. ........................................ 29/449; 29/450; 29/714; 29/717; 29/243.56

[58] Field of Search ................. 29/707, 713, 714, 715, 29/717, 235, 243.56, 449, 450

[56] References Cited

U.S. PATENT DOCUMENTS 4,253,227 3/1981 Bullington ........................ 29/243.56

FOREIGN PATENT DOCUMENTS 2512826 9/1976 Fed. Rep. of Germany .
3535852 10/1985 Fed. Rep. of Germany .
3709412 9/1988 Fed. Rep. of Germany .
3709413 9/1988 Fed. Rep. of Germany .

*Primary Examiner*—Timothy V. Eley
*Assistant Examiner*—C. Richard Martin
*Attorney, Agent, or Firm*—Brown, Martin, Haller & McClain

[57] ABSTRACT

The present invention concerns a process for fixing holding clips (1) to a band (2) which is movable in its longitudinal direction, wherein the band (2) is deformed transversely relative to the longitudinal direction in such a way that the spacing of the band edges (3, 4) becomes less than the band width and the internal spacing of the holding elements (5, 6) provided on the holding clip (1) and the part of the band (2) which is between the band edges (3, 4) is curved forwardly out of the plane of the band defined by the band edges (3, 4), the band edges (3, 4) are brought into position between the holding elements (5, 6) and the deformation is substantially removed again so that the band edges (3, 4) substantially resume their original spacing and the holding clip (1) comes into frictional engagement with the band (2), and a corresponding apparatus. In order to provide a process and an apparatus of that kind, which permit rapid and reliable fitting of the holding clips, which are reliable in operation and which in that respect are at the same time relatively inexpensive to produce, it is proposed in accordance with the invention that deformation of the band (2) is triggered by moving the holding clip (1) into the clip position and that release of the deformation is triggered either after a fixedly predeterminable time from triggering of the deformation or by a switch element (8) which directly or indirectly responds to deformation of the band (2).

23 Claims, 9 Drawing Sheets

Fig.6
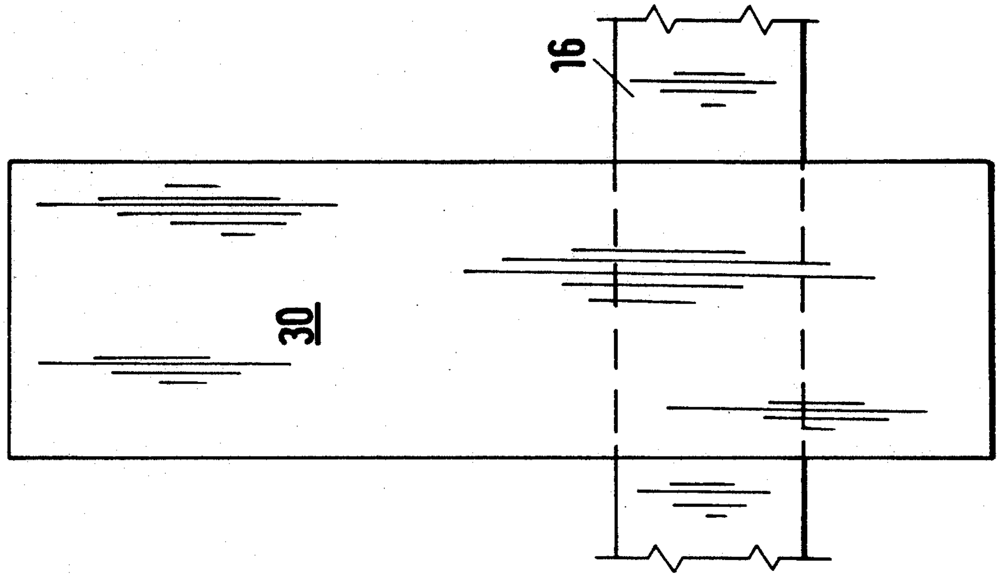
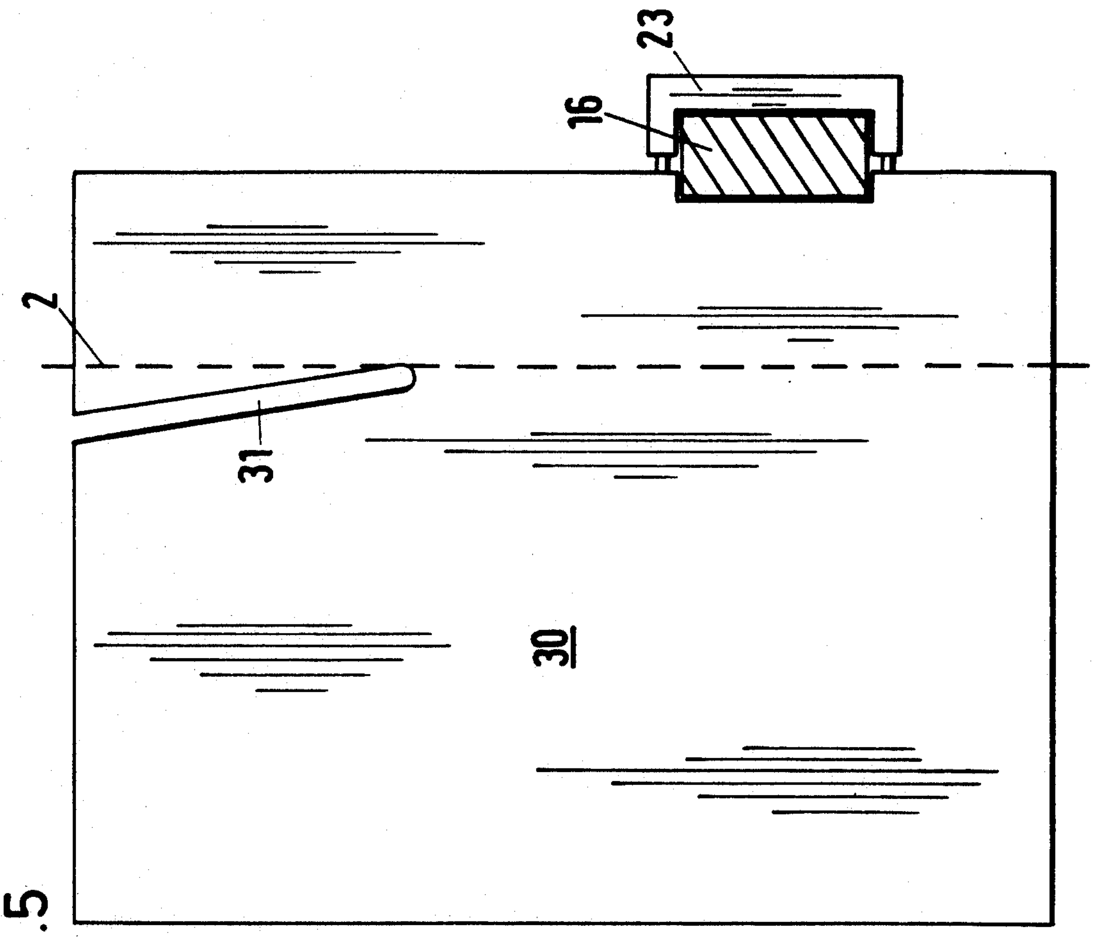
Fig.5

PROCESS AND APPARATUS FOR FIXING HOLDING CLIPS TO A BAND

BACKGROUND OF THE INVENTION

The present invention concerns a process for fixing holding clips to a band which is movable in its longitudinal direction, wherein the band is deformed transversely relative to the longitudinal direction in such a way that the spacing of the band edges becomes less than the band width and the internal spacing of the holding elements provided on the holding clip and the part of the band which is between the band edges is curved forwardly out of the plane of the band defined by the band edges, the band edges are brought into position between the holding elements and the deformation is substantially removed again so that the band edges substantially resume their original spacing and the holding clip comes into frictional engagement with the band.

The present invention also concerns a corresponding apparatus for fixing holding clips to a band or band-like material which is movable in its longitudinal direction, comprising deformation elements for the band, which deform the band in such a way that the spacing of the band edges becomes less than the band width and the internal spacing between holding elements of the holding clips, and guide elements for the band. A process and an apparatus of that kind are known from German laid-open application (DE-OS) No 37 09 412.

Likewise such a process and a corresponding apparatus are also already known from German patent No 2 512 826.

German laid-open application (DE-OS) No 37 09 413 is also concerned with a process and an apparatus for clipping holding clips to a band.

Such processes and apparatuses are used in particular for transporting films or photo paper through a processing machine. For that purpose a film, photo paper or the like which is to be transported through a processing machine is fixed to the end, which is of no further interest here, of the holding clip, while the other end of the holding clip has holding elements for fixing to what is known as a tow band which is driven and which thus transports the holding clip with the film or photo paper fixed thereto through the machine.

The corresponding tow bands generally comprise plastics material or fabric which is insensitive to the processing chemicals, and are more or less elastic. The holding elements of the holding clips, which elements engage the band, generally comprise U-shaped portions which face towards each other with their open sides and the limbs of the U-shapes of which are connected together on one side while on the other side they are open to receive the band between the U-shaped holding elements. In that arrangement the internal spacing of the two free limbs of the U-shapes is smaller than the width of the band and is therefore less than the spacing between the edges of the band. Before corresponding automatic clip fitting apparatuses where introduced, the edges of the band were gripped by hand by an operator and pressed together using the fingers, passed through between the free limbs of the U-shapes of the holding elements and released so that they could slide at both sides into the two U-shaped openings. In that arrangement the total width of the band substantially corresponds to the spacing between the base sides of the two U-shaped holding elements. The width of the U-shaped clip openings approximately corresponds to the thickness of the band so that it is in relatively firm frictional engagement with the clip and entrains same, especially when the clip is loaded at its free end to which the film material or photo paper is fixed.

In addition, another clip is known as disclosed in German laid-open application (DE-OS) No 35 35 852, which for fixing purposes has a substantially square opening with oppositely disposed projections projecting into the opening. Here too the internal spacing of the projections is less than the width of the band while the size of the square opening is moreover substantially the width dimension of the band. For the purposes of fixing such a clip to the band, the two edges of the band are also pressed together and moved from one side to the opening of the clip in such a way that the edges of the band snap into position behind the projections so that in the region of the projections the band is bent around same and is thus also in fixed frictional engagement with the clip.

It will be appreciated that, by means of corresponding processes and apparatuses, it is not only photo paper and films but for example also other material such as webs of paper or plastics material that can be transported in any manner by means of tow bands and for example threaded in printing machines between printing rollers or into other apparatuses for processing or treating the web of material.

For further details of the connection between the clip and the band, attention is directed to the specified state of the art.

The specified apparatuses, with the apparatus options available, substantially precisely emulate the operation which previously was also performed by hand. In the case of German patent specification No 2 512 826 the clip is accommodated in a feed device which is movable perpendicularly to the plane of the band and moved towards the band as soon as the edges of the band are suitably bent together. As soon as the clip has reached the band and the edges of the band have passed the free ends of the limbs of the U-shapes of the holding elements or the projections of the holding elements, the deformation elements release the band and thus allow the edges of the band to snap into position in the holding elements of the band clip.

In the case of the process and the apparatus of German laid-open application (DE-OS) No 37 09 412 the clip is guided prior to and during the clip-application procedure, like the band, parallel to the plane of the band in such a way that the outsides of the free limbs of the U-shapes shapes of the holding elements remain in contact with the edges of the band. By virtue of the above-indicated deformation of the band, the edges of the band are then stressed and pulled away due to the further deformation of the band under the limbs of the U-shapes of the holding elements and snap into the free space between the U-shaped openings, by virtue of the biasing effect. After the deformation ram member is moved back, the edges of the band then slide into the U-shaped openings of the holding elements. However that apparatus which the present invention takes as its basic starting point suffers from some serious disadvantages. The close guidance of the holding clip on the edges of the band, in order to allow it to snap into position between the holding elements, requires the guide elements to be of a very precise shaped configuration. Otherwise, that arrangement may give rise to earlier engagement at one side between an edge of the band and the holding clip so that the latter is tilted and becomes jammed in the narrow guide passage. Even if the guide passages for the band and the holding clip are of a highly precise configuration, that situation can occur by virtue of the fact that the edges of the band suffer from wear which is irregular from one position to another.

Depending on the respective spacing of the holding elements the band must be deformed to a very substantial degree and the ram member or punch must press the central portion of the band very deeply into a suitable die so that the edges of the band spring into position between the holding elements.

In practice, those problems have resulted in a corresponding apparatus being known and produced only in such a configuration that the entire apparatus is also moved along with the generally moving band, during the clip-fitting operation. An alternative to that lies in momentarily stopping the band, which however, in a continuously operating machine, requires a suitable band storage device upstream and downstream of the apparatus, which is highly expensive and complicated. In addition moving the apparatus with the moving band also requires a really expensive and complicated structure.

SUMMARY OF THE INVENTION

Therefore the object of the present invention is that of providing a process and an apparatus of the kind set forth in the opening part of this specification, which permit the holding clips to be applied quickly and reliably, which are reliable in operation, and which in that respect can at the same time be produced relatively inexpensively.

In regard to the process, that object is attained in that deformation of the band is triggered by the movement of the holding clip into the clip position and that release of the deformation is triggered either after a fixedly predeterminable time or by a switch element which directly or indirectly responds to the deformation of the band.

Accordingly that means that the clip does not already have to be in contact with the band for a prolonged period of time when the clip-application operation is triggered off. On the contrary the deformation elements are actuated precisely at the moment at which the holding clip is moved to its clip-application position or into the clip position.

In regard to the apparatus, for that purpose, there is provided a first switch elements which can be triggered by the chip and which in turn triggers actuation of the deformation elements. In addition that deformation is reversed again practically immediately after it has been performed in its entirety. That can be achieved by an electronic timing member if the apparatus has a current supply. An alternative to such an electronic timing member is a second switch element which responds either directly to the deformation of the band or to the movement of the deformation elements. The deformation elements being brought into and taken out of operation in spot-accurate fashion in that way results in a very fast and reliable clip-application operation in a fixedly predetermined clip position. More specifically, by a suitable guidance effect and/or a virtue of a corresponding configuration for the first switch element, it can be provided that the clip-application operation or deformation of the band is triggered off only when the clip is precisely in the correct clip-application position. By virtue of the deformation elements being practically immediately released again, the edges of the band snap into the holding elements of the clip, immediately after the deformation effect has been produced, before the clip could be moved out of the clip-application position.

In that respect the second switch element may also be identical to the first switch element. That would be possible for example by the first switch element being a resiliently mounted feeler or sensor member which is depressed by the clip and which triggers the deformation elements. As soon as the clip is released, it is moved upwardly by the spring force of the feeler or sensor member, the feeler or sensor member now acting as a second switch element and releasing the deformation elements again. Therefore indirect detection of the deformation of the band also involves the possibility of actuation of the first switch element being detected.

In that connection it is in particular not necessary for the holding clip to be kept in contact with the edges of the band prior to and during the deformation operation. On the contrary it has been found that the clip-application operation operates in a better fashion if the edges of the band are not held in their original plane by the holding clip but if the holding clip has a certain, even if small, spacing or a distinct clearance in a direction transversely to the plane of the band.

In that case the edges of the band can already move freely at the beginning of the deformation operation and can move away from the plane of the band in a direction towards the holding clip, in which case they do at most briefly graze the edges of the holding elements. That not only facilitates and accelerates the clip-application operation but also markedly reduces the wear at the edges of the band. It would also be possible to envisage the holding clip admittedly being in light contact with the edges of the band, but being resiliently mounted at its rear and urged away lightly by the edges of the band which rise up in the deformation operation and which then also rapidly engage into the holding elements, with a small amount of wear.

In that connection it is provided in accordance with the invention that the deformation, as viewed in the direction of movement of the band, occurs primarily behind the clip position. It will be appreciated that the deformation effect must extend into the clip-application region so that a clip-application operation can take place at all. However the deformation element itself does not have to engage the band precisely in the region of the clip position but deformation preferably occurs behind the clip position, as viewed in the direction of movement. That has also been found to be more advantageous, for reliable clip fitting.

As already mentioned, in addition in the preferred embodiment of the invention the holding elements are to be held at a spacing relative to the plane defined by the non-deformed band, at least in the clip position itself and in the approach to that position. That prevents frictional contact between the edges of the band and the holding elements and that, as already mentioned, reduces the amount of wear at the edges of the band and permits the edges of the band to be more quickly and more reliably engaged into the holding clips upon deformation of the band.

A particular configuration of the process according to the present invention provides that two interconnected clips are to be simultaneously fixed to two bands, wherein the operation of fitting each individual clip is effected by a process and with an apparatus in accordance with the present invention. The connection between such clips is substantially rigid and serves for example to guide large pieces of photo paper, slides or transparencies or posters at the connecting element between the two clips, through a developing machine or the like. With that combination of two clip-fitting apparatuses, in a configuration of the present invention, it is provided that the deformation elements of the two clipping apparatuses are triggered by a functional series connection only when both clips are simultaneously in their clip position or close to that position. On the assumption that both apparatuses are arranged at the same level, the clip-application operation is then also effected precisely at the same level on both tow bands and skewing of the clips and the pieces of paper or webs of material fixed thereto is reliably avoided.

In a particular configuration of the apparatus according to the invention it is provided that at least one of the switch elements is a pneumatic switch element. Pneumatic switch elements are known per se and have the advantage that they are totally devoid of electrical connections. It will be appreciated that both switch elements are then preferably pneumatic switches so that the apparatus is then entirely without an electrical connection and is to be operated exclusively by means of compressed air. In that case the deformation elements are also actuated pneumatically.

Desirably, what is known as a clip guide means is provided for moving the holding clip into the clip-application position.

The clip guide means is admittedly known per se but in accordance with the present invention it is preferably in the form of a flat metal strip which can be introduced between the holding elements of the clip and which in addition, in the preferred embodiment of the invention, is inclined somewhat relative to the plane of the band. Although at first sight it may seem surprising that the position which in itself is to be occupied by the band can at the same time be occupied by a flat material strip, the latter, comprising metal or plastics material, can possibly be made very thin, in which respect moreover that mode of moving the holding clip to the clip-application position ensures the desired spacing relative to the edges of the band and is surprisingly good in operation. In that connection, the guide means in the form of the flat metal strip desirably comprises in plan view two inclinedly converging edges whose spacing at the tapered end is less than the internal spacing of the holding elements and at the wider end substantially corresponds to the width of the band.

The second switch element is preferably provided in the band curvature region on the forwardly curvable side of the band. That ensures that the second switch element is triggered when and only when deformation and thus forward curvature of the band actually occurs, which is related to the edges of the band being brought together and moved in a direction towards the holding elements. That switch element then immediately triggers off again reversal of the deformation procedure.

In the preferred embodiment of the invention, a fixing rail for the clip-fitting apparatus is provided transversely to the direction of movement of the band and parallel to the plane of the band. The clip-fitting apparatus can then be displaced in a horizontal direction transversely with respect to the band and can be adapted to a band travel configuration which possibly varies or which can be changed around. That is particularly important in relation to installations in which a plurality of bands extend parallel in a machine, in which case the spacing thereof must be altered when dealing with different formats of pictures or films. That adjustability further permits fine adaptation and re-adjustment for the purposes of optimising the clip-application procedure.

Desirably, a band support is provided also on the forwardly curvable side of the band but at a spacing relative to the prescribed curvature region. The band support may comprise for example a plastics block which extends transversely with respect to the band and which is as smooth as possible or a corresponding roller which extends over the entire width of the band. The band support contributes to reversing deformation of the band very quickly again after release thereof by the deformation elements, so that the edges of the band rapidly engage into the clip.

When using a band support of that kind, it has been found particularly advantageous if the first switch element and thus the clip position lie between the band support and the deformation elements, as viewed in the direction of movement of the band.

In accordance with a first embodiment of the invention, the deformation elements essentially comprise a ram member or punch and a die between which the band is passed, wherein the ram member carries at its head a wheel which is capable of rolling against the band and the die is a hollow profile which is open towards the band and whose edges which came into contact with the band are inclined towards the plane of the band and converge away from the band. A ram member of that kind may be actuated for example electromagnetically, by way of springs or pneumatically.

In accordance with another embodiment of the invention the deformation element is a gripper having at least two gripping claws which engage the oppositely disposed edges of the band. The gripping claws act in a similar fashion to a human hand which, prior to the use of such apparatuses, also pressed the edges of the band together and introduced them between the holding elements of the clips.

In that connection, it is provided that the gripping claws have recesses for receiving the edges of the band so that the edges cannot slip out of the gripping claws. In order to ensure that, upon being deformed by the gripping claws, the band is always curved forwardly in the same direction, away from the holding clip, while the edges of the band face towards the clip, it is further provided in accordance with the invention that the surfaces of the gripping claws, which surfaces come into contact with the edges of the band, are at least in part inclined relative to the plane of the band in such a way that, upon coming into engagement with those inclined surfaces, the edges of the band are moved towards the clip feed side. Therefore the edges of the band are not merely pressed together but are initially already moved out of the plane of the band towards the clip so that then, when the edges of the band are pressed together by the gripping claws, the band is of necessity curved forwardly away from the holding clip.

Alternatively that can also be achieved by the path of movement of the gripping claws, in the region of contact with the edges of the band, besides the component in the plane of the band which is required for the edges of the band to be pressed together, also has a component perpendicular to the plane of the band and in a direction towards the clip feed side.

In that respect the gripping arms may for example pivot towards each other about respective axes. It is however also possible to provide arms which are displaceable in parallel relationship, referred to as parallel grippers. In practice it is also possible to use complicated composite movements of the gripper arms for the specified purpose. Instead of the recesses at the front end of the gripper arms it is also possible to provide profiled rollers which roll against the edges of the band and thus protect same by treating them carefully.

In addition, in the preferred embodiment of the invention, there is provided a sensor for detecting connections in the band, which when a connection is detected temporarily blocks at least the first switch element and/or the deformation elements. The connections in deformable endless bands of that kind generally consists of metal clips, springs or the like so that the band is not deformable or is only poorly deformable in the region of the connection and deformation of the band could damage such a connection. The sensor provides that such deformation does not occur when a connection in the band is passing through the apparatus.

In an embodiment of the invention in which two interconnected clips are to be simultaneously applied to two bands which move in parallel relationship, it is provided in accordance with the invention that the two first switch elements of the two apparatuses are functionally connected in series. That means that the deformation elements which are to be triggered by the switch elements are set in operation only when both first switch elements are simultaneously actuated. That guarantees precisely synchronised fitting of the two clips, in a manner which corresponds to the alignment of the apparatuses. It will be apparent to the man skilled in the art that he can construct the last-mentioned embodiment and also the embodiment with grippers without a time delay switch member and also without the second switch member. Conversely the use of the time delay switch member and/or the second switch element possibly makes it possible to forgo the first switch element which is actuated by the holding clip. If, as viewed in the direction of movement of the band, the sequence of clip position and deformation elements is reversed, then when using the other features from the subsidiary claims, it is also possible to forgo both switch elements.

BRIEF DESCRIPTION OF THE DRAWINGS

Further advantages, features and possible uses of the present invention will be apparent from the following description of a preferred embodiment and the drawings relating thereto in which:

FIG. 5 is a side view of the housing of the apparatus, FIG. 6 is a rear view of the housing.

DETAILED DESCRIPTION AND PREFERRED EMBODIMENTS

Figure 1:
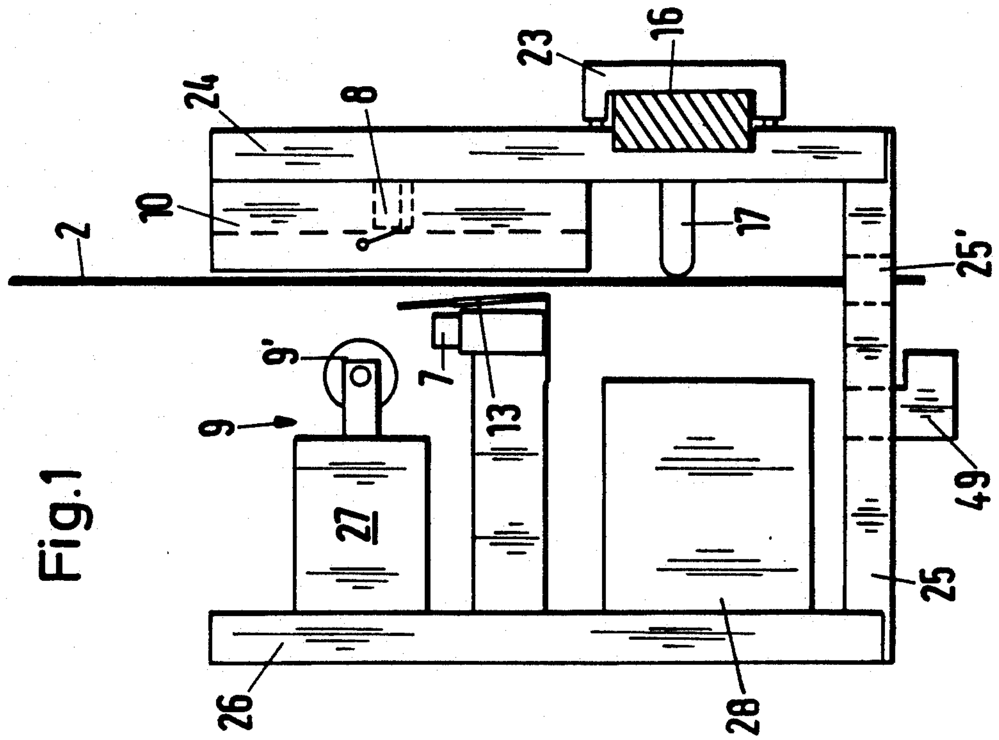
FIG. 1 is a side view of the clip-fitting apparatus without external protective housing.

FIG. 1 is a view in longitudinal section of a frame 24 which is secured to a transverse rail 16 by a clip member 23. The frame 24 is substantially U-shaped, wherein the connecting limb 25 of the U-shape has a slot 25' for the band 2 to be passed therethrough, the band 2 moving in a vertical direction upwardly through the apparatus. Secured to the limb 24 of the U-shape is a die or female member 10 in the form of a hollow profile. Secured to the oppositely disposed limb 26 of the U-shape is a pneumatic cylinder 27 which can move a punch or ram member 9 towards the band. The head of the ram member 9 is provided with a wheel 9' which can roll against the upwardly moving band 2 when it comes into contact therewith. A pneumatic switch element 8 is arranged on the side of the band 2, which is opposite to the wheel 9'. A guide element 13 which is shown in greater detail in FIGS. 3 and 4 accommodates the holding elements of a holding clip 1. When the holding clip 1 is pushed onto the guide element 13, it comes into contact with the switch element 7 which is arranged closely therebehind and which triggers actuation of the pneumatic cylinder 27 so that the ram member 9 presses with the wheel 9' against the band 2 which is thereby curved rearwardly into the cavity of the die 10.

As the free intermediate space in the hollow profile or die 10 is markedly narrower than the band, only the central portion of the band 2 can be pressed into the die 10, while the edges of the band lift away from the edges of the die in the opposite direction, that is to say towards the holding clip which is carried on the guide element 13. That procedure is shown in principle in FIG. 2 of German laid-open application (DE-OS) No. 37 09 412, but in the present case the holding elements do not lie against the edges of the band so that the edges of the band can readily lift off the support edges of the die. In that connection the die is so shaped and dimensioned in a suitable fashion that the lifting movement of the edges of the band is sufficient to bring them into position between the holding elements of the clip 1.

Arranged in the cavity of the die opposite the ram member 9 is a switch element 8 which is triggered by the band 2 when it is curved forwardly into the die 10 by the wheel 9'. The switch element 8 now in turn causes actuation of the pneumatic cylinder 27 in such a way that the ram member 9 is retracted again. When that happens the edges 3, 4 of the band slip behind the U-shaped holding elements of the holding clip 1 and entrain the latter upwardly, with the switch 7 being released at the same time. Simultaneously the ram member 9 or the wheel 9' clears the way for the clip 1 which is entrained upwardly by the band 2. The clip 1 is diagrammatically shown in FIG. 2, with its holding elements 5, 6 which are bent in a U-shape configuration.

The clip position is directly at the level of the switch 7 so that the pneumatic cylinder 27 is immediately triggered when the holding clip 1 has reached the clip-application position or has very closely approached same.

Figure 2:
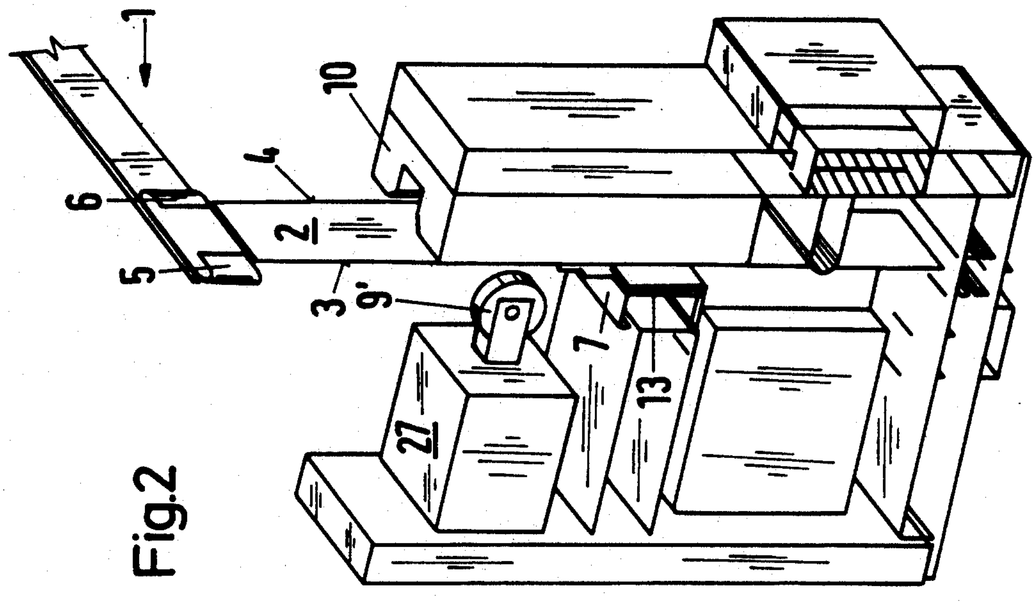
FIG. 2 is a perspective view of the apparatus shown in FIG. 1.

FIG. 2 is a perspective view of the apparatus shown in FIG. 1. All the Figures are essentially only diagrammatic views which do not show all details of the apparatus, which are immaterial from the point of view of the present invention. The dimensions and size relationships are not precisely reproduced in the drawings but the proportions essentially correspond to an embodiment which was actually produced. The bands typically used are from about 40 to 50 mm in width, and a prototype of the illustrated apparatus has housing dimensions of about 25 cm in height, 20 cm in depth and 6 cm in width.

Shown in the bottom left region in FIG. 1 is a block 28 representing a housing for electronic components or pneumatic valves. This is intended to indicate that the pneumatic cylinder 27 can also be selectively replaced by an electromagnetically actuated or motorised element. Arranged in that region therefore, in the case of an electrically operating apparatus, are suitable electrical or electronic circuits while in the case of a pneumatic construction there are pneumatic valves. Reference numeral 49 identifies a suitable compressed air or cable connection. That is intentionally arranged at the underside of the apparatus so that corresponding feed lines do not interfere with operation of the apparatus. Reference numeral 17 in FIGS. 1 and 2 identifies a band support which, beneath the clip-application position and beneath the deformation region, supports the band on the side on which, further upwardly, it is curved into the die 10. The band support thus provides a return force so that in that way the edges of the band slide more quickly into the holding elements 5, 6 of the clip 1. It will be appreciated that the guide element 13 must be made from relatively thin material so that the edges of the band and the guide element 13, at the moment of the edges of the band sliding into the holding elements of the clips, jointly have space in the holding elements of the clips. Usually however the clips have adequate clearance. Otherwise, frictional engagement with the edges of the band already occurs directly upon contact with the edges of the holding elements 5, 6 so that the holding clip is immediately lifted and the edges 3, 4 of the band can possibly also slip completely into the holding elements only when the holding clip 1 is lifted to such an extent that the guide element 13 has entirely freed the holding elements 5, 6.

In the case of an electrical or electro-pneumatic construction, it is admittedly also possible to use a corresponding electrical and/or pneumatic switch element 8, but it can also be simply replaced by an electronic timing member in the electronic circuitry, which provides that the ram member 9 is immediately withdrawn after it is extended into the desired end position for deformation of the band 2. The switch element 8 could also be arranged on the other side of the band 2, for example in such a way that it is actuated by a projection which is disposed on the ram member 9 and which is so arranged that it reaches the switch element 8 precisely when the ram member 9 or the wheel 9′ have reached the point of maximum intended deflection.

Figure 4:
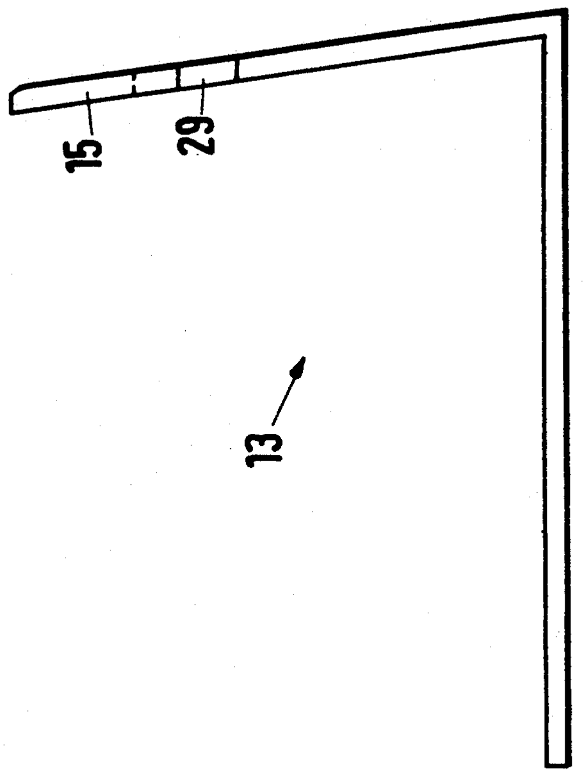
FIG. 4 is a side view of the clip guide means.
Figure 3:
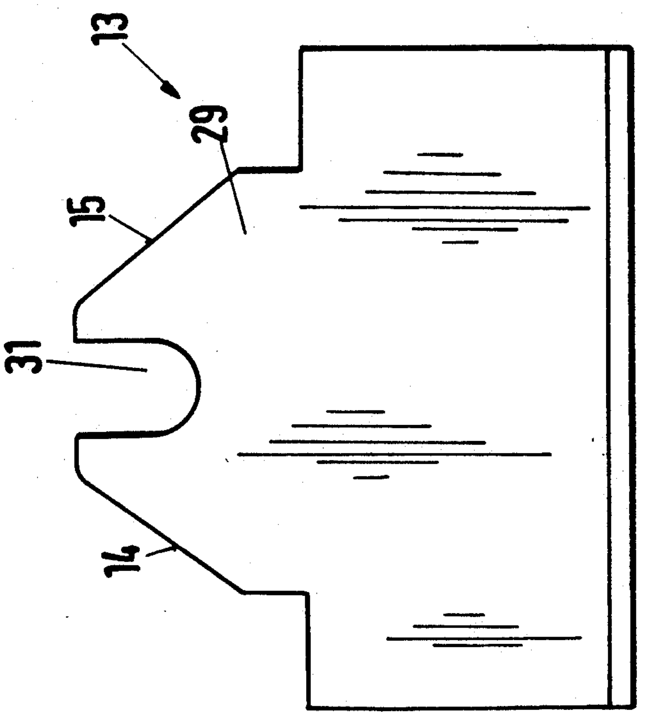
FIG. 3 is a plan view of the clip guide means.

The guide element 13 is shown in greater detail in FIGS. 3 and 4. The guide element 13 essentially comprises a flat angled sheet metal strip. The actual guide function is performed by the upper end 29 which in plan view is substantially in the form of an isosceles triangle with the apexes cut off. In the lower wider region the width of the member 29 preferably corresponds to the width of the band 2 and is at any event such that that portion can be accommodated between the U-shaped holding elements 5, 6 of a holding clip 1 and engages into same when the holding clip is pushed onto the guide element. In that situation the inclinedly extending upper edges 14, 15 make it easier for the holding clip 1 to be pushed onto the guide element 13. In addition, provided in the upper cut-off side of the guide element 13 is a downwardly extending recess through which the wheel 9′ or the ram member 9 can pass when the pneumatic cylinder 27 is actuated, in order in that way to be able to come into contact with the band 1 as closely as possible above the clip position. The clip-application position is defined by the lower wider portion of the part 29. In that position, on its rear side the clip has triggered the switch 7 but it cannot be moved further downwardly as here the guide element 13 again has a stepped enlargement which is greater than the internal spacing of the holding elements 5, 6. As can be seen from FIG. 4, the portion 29 of the guide element 13 is angled and extends inclinedly somewhat relative to the plane of the band. That contributes to the holding clip not rubbing against the band while also maintaining a certain minimum spacing relative to the edges of the band, even in the clip-application position.

FIG. 5 shows the housing 30 of the apparatus, which is simply pushed onto the U-shaped frame 24, 25, 26. The holding clip is introduced into the slot 31 so that it finally encounters the guide element 13 in the lower region of the slot 31. The configuration of the band 2 in the housing 30 is also diagrammatically indicated by a broken line.

FIG. 6 is a rear view of the housing 30 which, in conjunction with FIG. 5, shows the approximate proportions of the apparatus. The rail 16 extends in the transverse direction in the plane of the band and perpendicularly to the direction of movement of the band over a substantial working area and thus permits horizontal displacement of the apparatus to different positions if the position of the band correspondingly moves.

Figure 7:
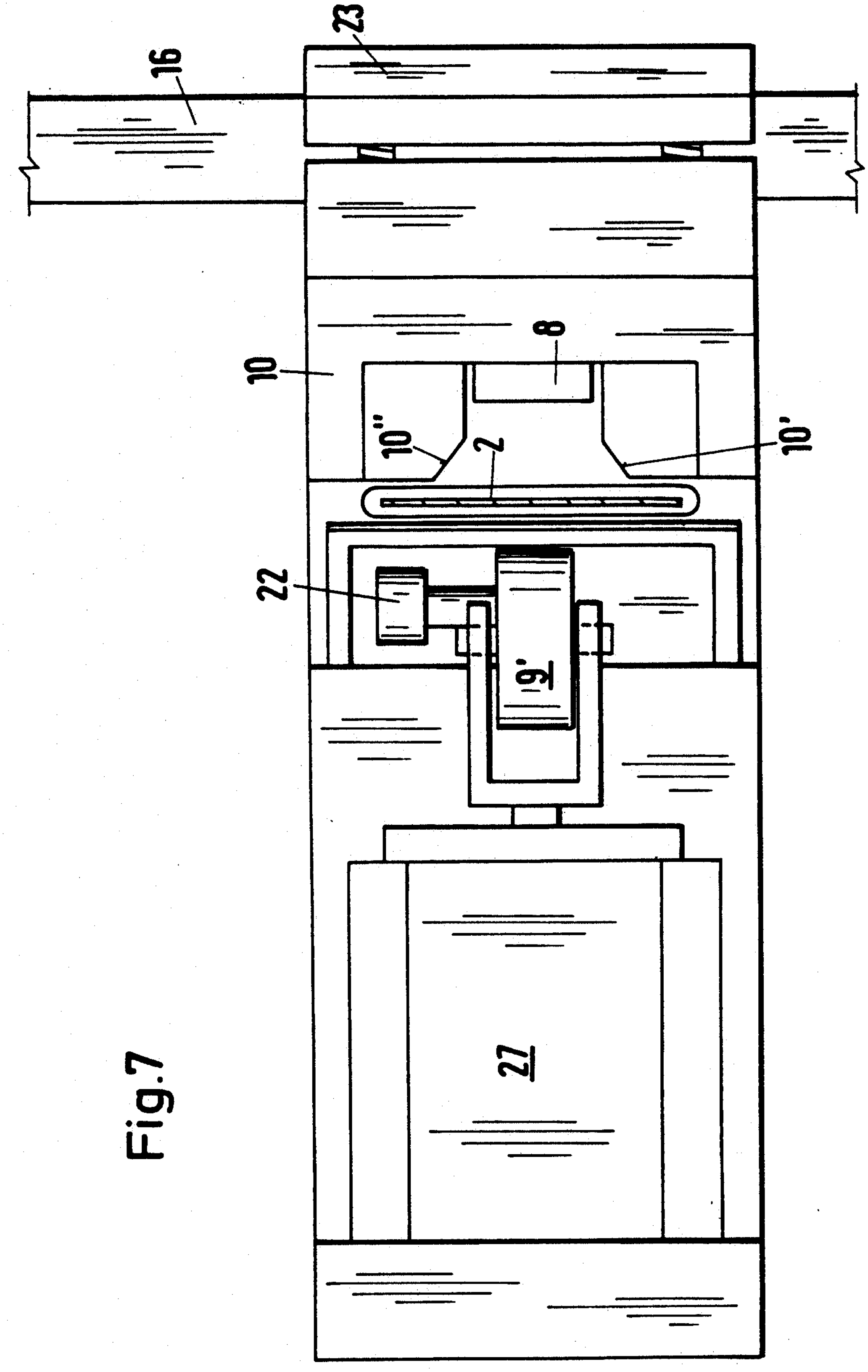
FIG. 7 is a horizontal section through the apparatus.

FIG. 7 essentially corresponds to a horizontal section or a plan view from above of FIG. 1. Shown therein is the roller 9′ which urges the band 2 into the die 10. While in that situation the central portion of the band 2 finally comes into contact with the switch element 8, the edges 3, 4 of the band are bent away from the die 10 in a direction towards the holding clip 1 (not shown) which is arranged immediately in front of the band.

Reference numeral 22 in FIG. 7 identifies a sensor which detects the connections in the band and, by responding to such a connection, temporarily blocks the pneumatic system so that the connection in the band is not exposed to deformation by the deformation elements 9, 9′ and 10. FIG. 7 clearly shows the inclined edge surfaces 10, 10′ which may also be rounded and which facilitate deformation and the specific return movement of the band 2.

Figure 8:
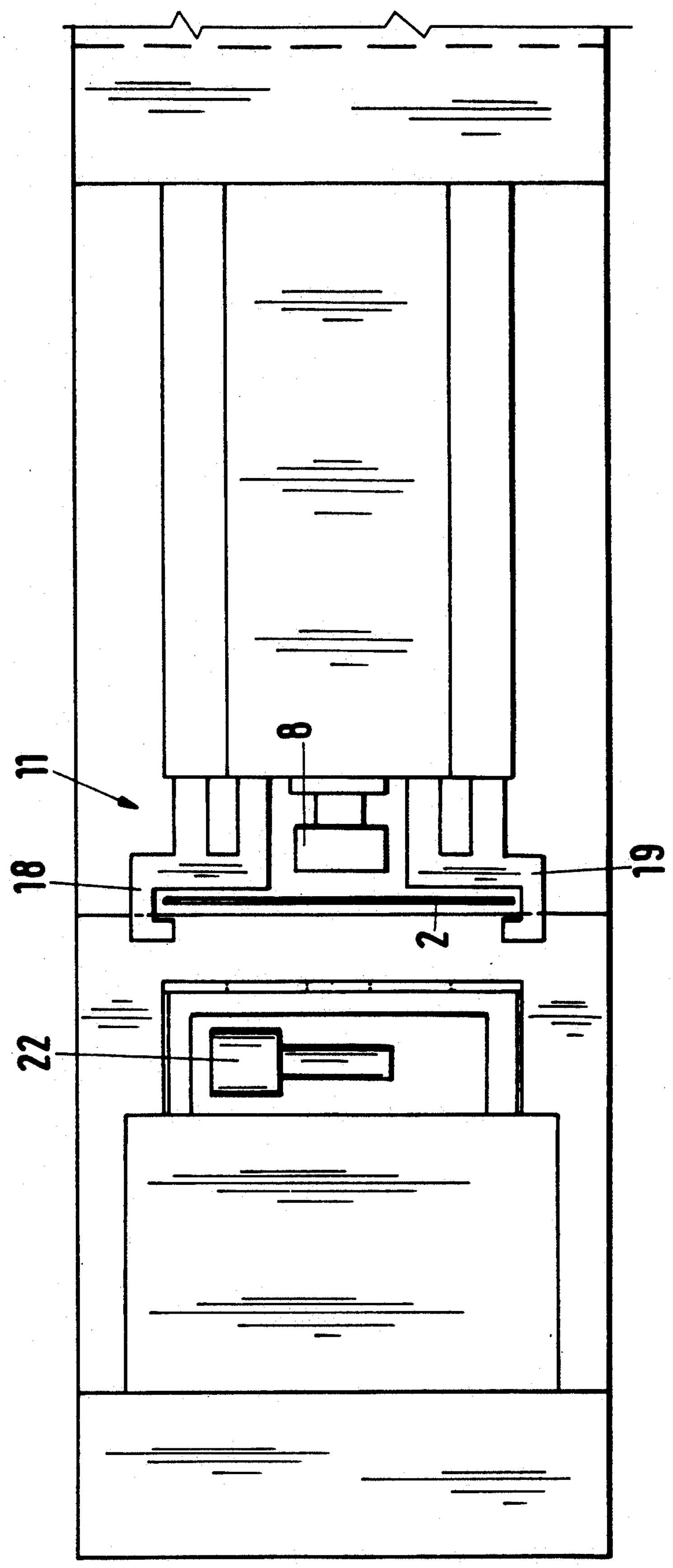
FIG. 8 is a horizontal section through a second embodiment.

FIG. 8 is a view of another embodiment of the invention, which substantially corresponds to the view shown in FIG. 7. In this case the band 2 is guided between the claws 18, 19 of a gripper 11. The clip can be guided in the same manner as in the above-indicated embodiments. Here also there is a switch element 8 which detects the deformation of the band 2 and reverses the gripper movement, which causes the deformation effect, by responding to the band deformation. In this case also a sensor 22 detects connections in the band 2.

Figure 9:
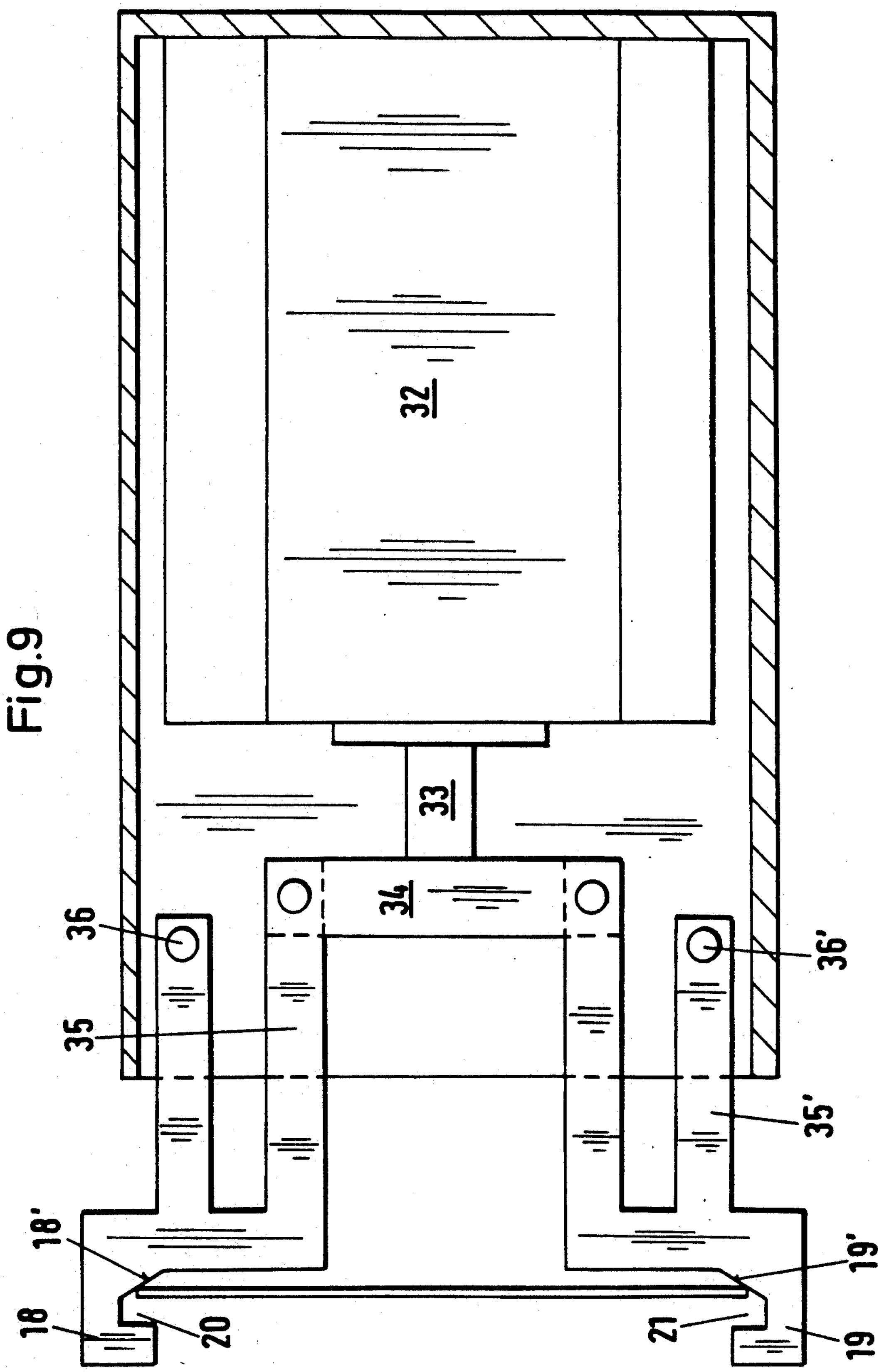
FIG. 9 is a view on an enlarged scale of part of FIG. 8.

Further details of this embodiment can be seen from FIG. 9. In connection with this embodiment, it is in principle to be noted that the curvature of the band occurs in the desired direction, that is to say in the case of the arrangement illustrated herein, into the inner region between the claws 18, 19. In order to ensure this, there are in principle two different options. On the one hand, the surfaces 18', 19' which come into contact with the edges 3, 4 of the band may be inclined in the illustrated fashion so that the edges 3, 4 of the band are bent out of the plane of the band towards the left in FIG. 9, whereupon, when the edges 3, 4 of the band are further pressed together by the claws 18, 19 moving towards each other, the central portion of the band 2 is necessarily curved towards the right. The claws 18, 19 are provided with recesses 20, 21 into which the edges 3, 4 of the band project, in order thereby to ensure that the edges 3, 4 cannot slip away from the claws 18, 19 and are securely pressed together to the desired degree. The embodiment illustrated herein also has a pneumatic cylinder 32 which is triggered by the holding clip 1 coming into contact with a switch (not shown), similarly to the switch 7 in the first embodiment above. In that way, the ram member 33 is withdrawn into the interior of the cylinder 32, the ram member 33 being pivotally connected by way of a transverse carrier member 34 to two levers 35, 35'. The claws 18, 19 are also mounted at pivots 36, 36' so that they are pivoted about the pivots 36, 36' by the pulling force applied to the levers 35 by the carrier member 34.

Figure 10:
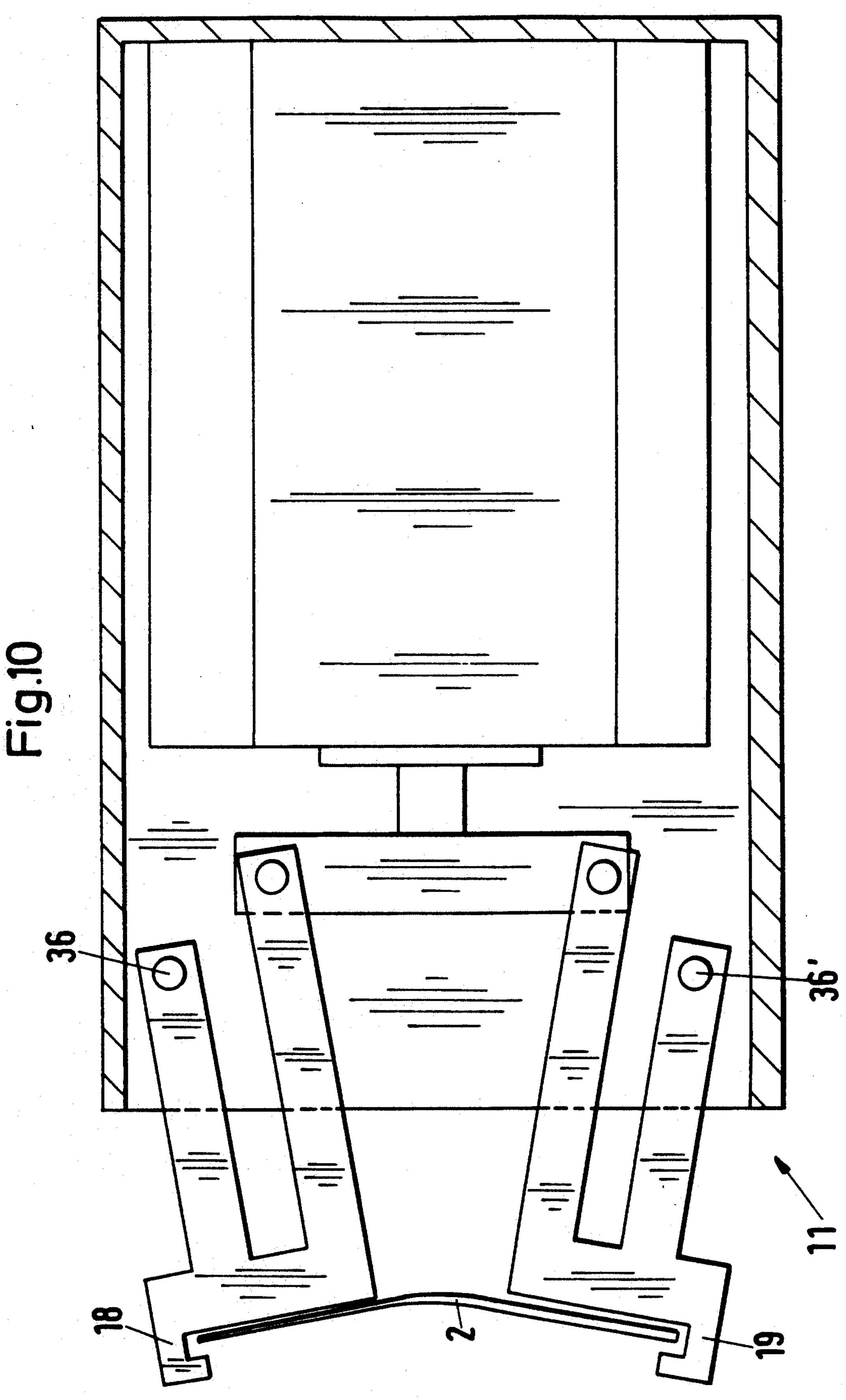
FIG. 10 shows the mode of operation of the second embodiment.

As the band 2 is disposed substantially symmetrically relative to the pivots 36, 36' and as moreover the band 2 is wider than the spacing between the pivots 36, 36', in the region in which the claws come into contact with the edges 3, 4 of the band the claws have a component of motion not only in the plane of the band but also perpendicularly to the plane of the band, more specifically in such a fashion that the edges of the band are moved towards the left in FIGS. 9 and 10 so that also gives rise to the deformation of the band in the desired fashion. The inclined surfaces 18', 19' may therefore also be omitted with such a design configuration, but they do possibly afford additional support in regard to producing the desired deformation.

Figure 12:
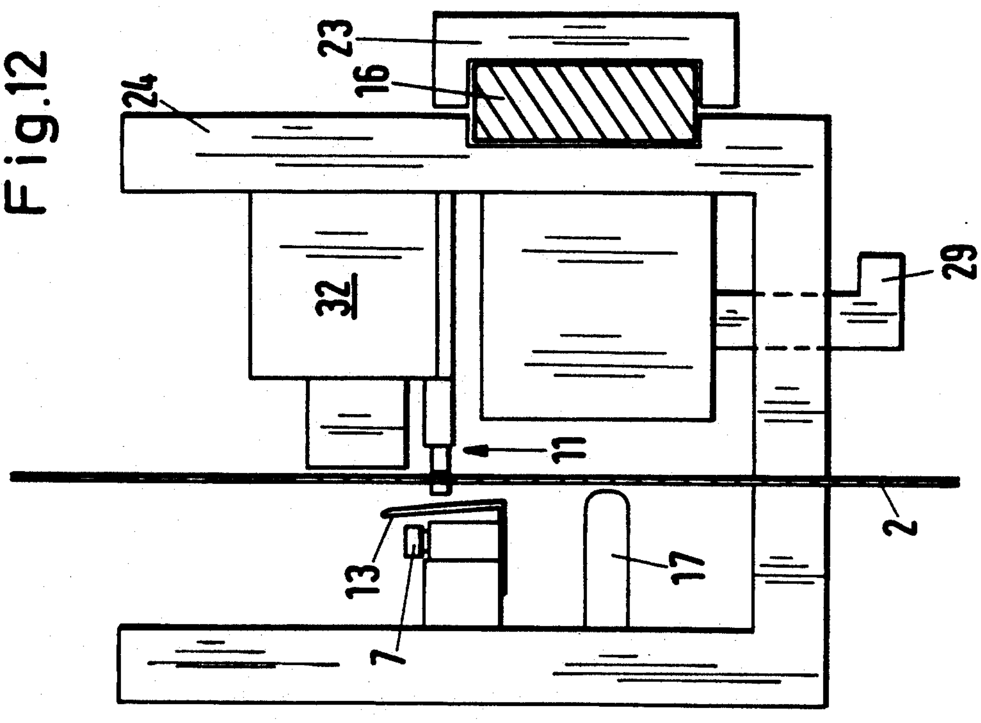
FIG. 12 shows the housing associated with the second embodiment.
Figure 11:
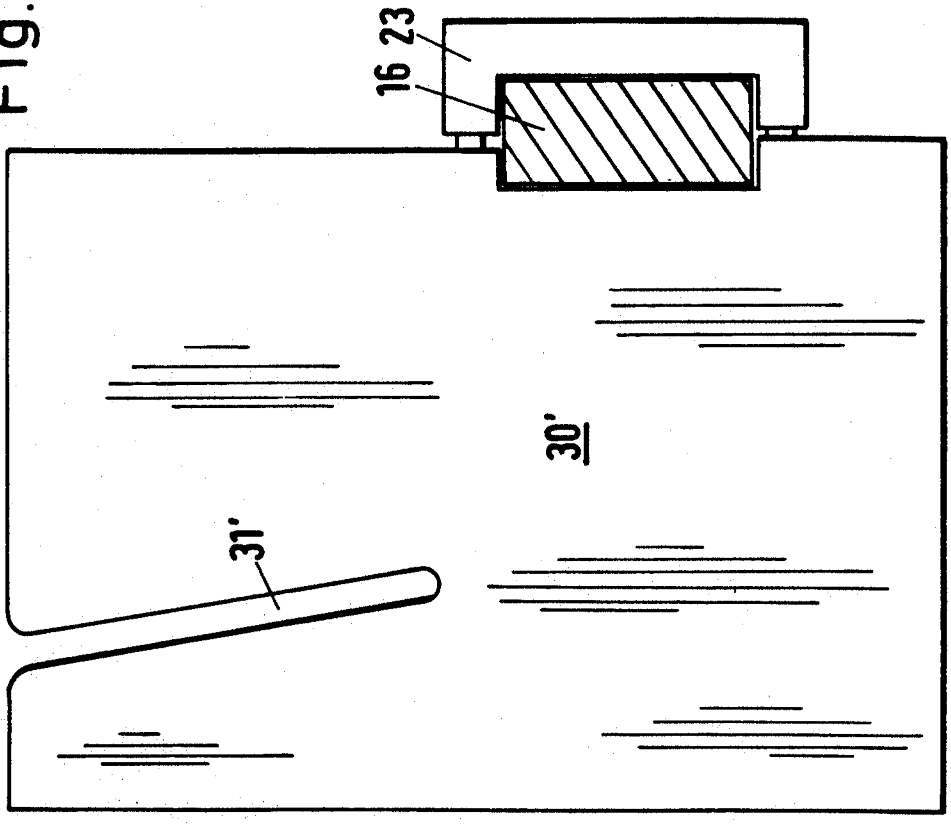
FIG. 11 is a view in vertical section through the second embodiment.

In comparison with the first-mentioned embodiment, as can be seen from FIG. 11, the pneumatic cylinder is arranged on the other side of the band 2. Accordingly the positions of the band are displaced relative to the U-shaped frame 24, 25, 26 and the guide rail 16, and likewise also the housing 30' which is shown in FIG. 12 has a slot 31' which is displaced in comparison with the first-mentioned embodiment.

Figure 13:
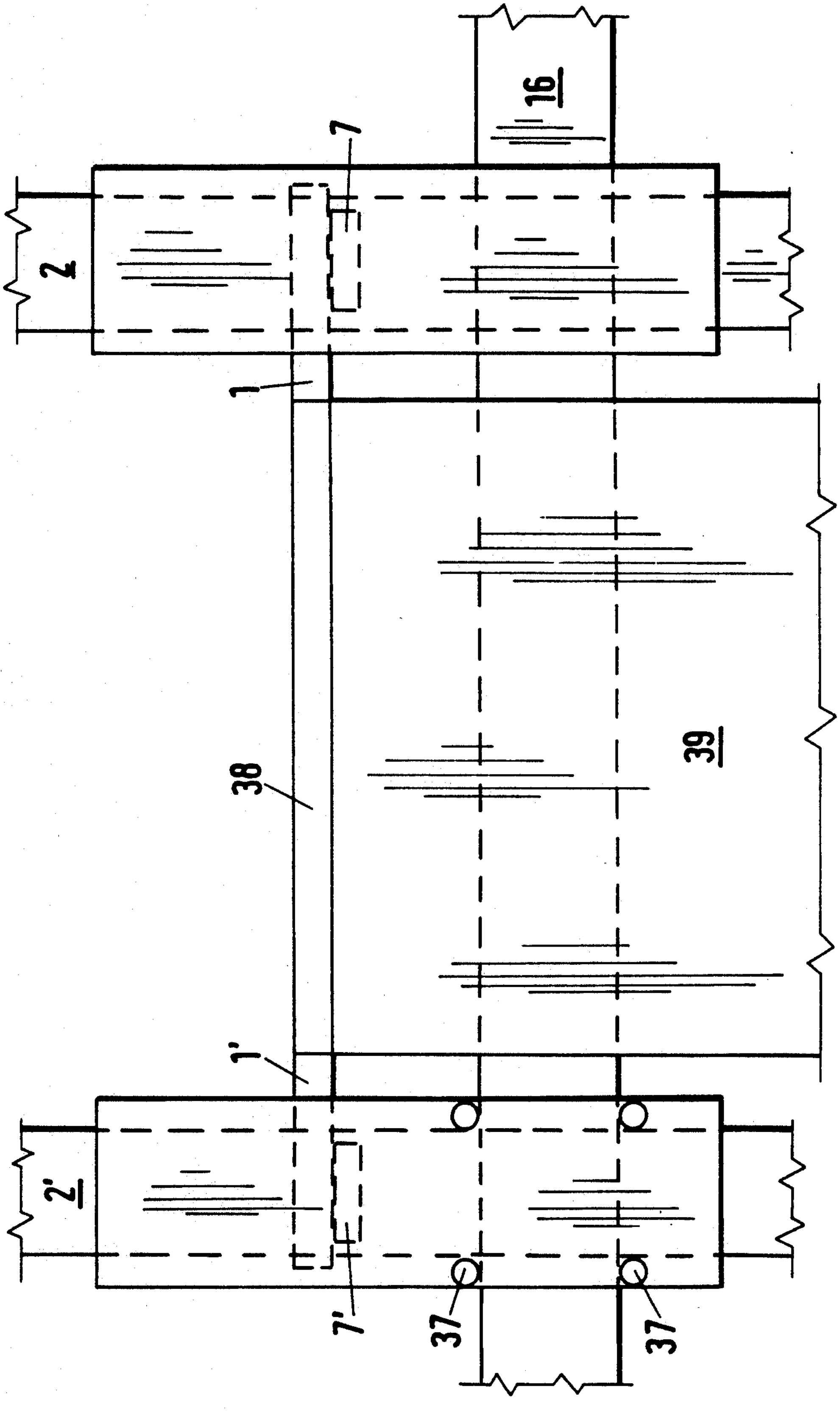
FIG. 13 shows two spaced-apart apparatuses for the simultaneous fitting of two interconnected holding clips.

FIG. 13 shows two apparatuses mounted at a spacing from each other on a rail 16. One of the two apparatuses or both thereof may be mounted on the rail 16 in such a way that they can move horizontally on rollers 37 and can possibly be fixed on the rail by clamping screws or the like. Two clips 1, 1' are connected together by a rigid connector 38, although at least one of the two clips 1, 1' may be mounted movably relative to the other holding clip by way of a sprung slot connection 39. In that way the arrangement can compensate for minor deviations in regard to the guide paths of the bands or even a minor lead on the part of one of the bands.

In other respects the spacing of the bands 2, 2' substantially corresponds to the spacing of the holding clips 1, 1'. Both clips 1, 1' are now more or less simultaneously but possibly also with a certain relative delay pushed into suitable guide slots 31 or the like into the apparatuses and possibly also pushed onto a guide member 13. The corresponding switches 7, 7' are however coupled together in such a way that the deformation elements, for example therefore the pneumatic cylinder 27 with ram member 9 and wheel 9' or the gripper 11 on both apparatuses are simultaneously triggered only when both switch elements 7, 7' are simultaneously actuated.

The holding clips 1, 1' are then simultaneously fixed to the bands 2, 2' at precisely the same level so that the connecting carrier 38 extends precisely in the desired orientation perpendicularly to the two bands 2, 2'. Sheets or webs of larger size, for example posters or the like which must be passed through corresponding treatment baths can be secured to the carrier 38.

The pneumatic cylinders referred to in connection with the above-described embodiments may obviously also be replaced by any other control members such as for example hydraulic cylinders, stepping motors, electromagnetically operated elements or the like.

The present invention which has already been carried into effect in prototype form therefore represents a considerable simplification and improvement in terms of operational reliability of the previously known clip-fitting apparatuses which have been carried into practical effect.

I claim:

1. A process for attaching a clip to a longitudinally extending band having width while said band is moving in a longitudinal direction, said clip having holding elements forming recesses at its ends, which process comprises:

providing a clip application position adjacent to a first surface of said band, in which position said ends of said clip are substantially aligned with lateral edges of said band;

providing adjacent to a second surface of said band and on the opposite side of said band from said clip application position a die having a longitudinally extending groove therein;

placing said clip in said clip application position and then in rapid succession:

in response to said placing of said clip, deforming said band transversely relative to said longitudinal direction by forcing that portion of said band adjacent to said clip into said groove in said backing plate, said band being deformed in an amount sufficient to cause the spacing between said lateral edges of said band to become less than said band width and also less than the spacing between said recesses formed by said holding elements of said clip;

causing said lateral edges of said band to move into position in said recesses formed by said holding elements of said clip;

generating a release signal; and in response to said signal releasing said deformation such that said lateral edges of said band substantially resume their original spacing and said band thereby comes into frictional engagement with said clip through said recesses and is thereafter retained on said band as said moves past said clip application position.

2. A process according to claim 1 wherein said release signal is generated by a timer and occurs following the expiration of a predetermined amount of time.

3. A process according to claim 1 wherein said release signal is generated by switch means responsive to said deformation of said band.

4. A process according to claim 1 wherein there are a plurality of bands each having a respective clip and clip application position, and said deformation of each of said bands is initiated only when all of said clips are substantially in their respective clip application positions.

5. A process according to claim 4 further comprising generating a positioning signal when all said clips are substantially in their respective clip application positions.

6. A process according to claim 1 wherein said deformation, as viewed in the direction of movement of the band, occurs primarily downstream of said clip application position.

7. A process according to claim 1 wherein at least in said clip application position and when approaching same said holding elements are spaced apart from a plane which is defined by said band prior to said deformation.

8. Apparatus for attaching a clip to a longitudinally extending band having width while said band is moving in a longitudinal direction, said clip having holding elements forming recesses at its ends, which apparatus comprises:

a clip guide disposed in a clip application position adjacent to one surface of said band, in which position said ends of said clip are substantially aligned with lateral edges of said band;

first signal generation means adjacent said clip guide and disposed such that placement of said clip on said guide activates said first signal generation means to generate an activation signal;

a die adjacent to a second surface of said band and on the opposite side of said band from said clip application position, said die having a longitudinally extending groove therein;

deforming means operably responsive to said activation signal for deforming said band transversely relative to said longitudinal direction by forcing that portion of said band adjacent to said clip into said groove in said die, said band being deformed in an amount sufficient to cause the spacing between said lateral edges of said band to become less than said band width and also less than the spacing between said recesses formed by said holding elements of said clip, such that said lateral edges of said band move into position in said recesses formed by said holding elements of said clip;

second signal generation means responsive to said deformation for generating a release signal; and release means responsive to said release signal for releasing said deformation such that said lateral edges of said band substantially resume their original spacing and said band thereby comes into frictional engagement with said clip through said recesses and is thereafter retained on said band as said moves past said clip application position.

9. Apparatus according to claim 8 wherein said clip guide comprises a flat material strip which can be introduced between said holding elements.

10. Apparatus according to claim 9 wherein said flat material strip extends inclinedly with respect to the plane of the band.

11. Apparatus according to claim 9 wherein said clip guide has a tapered shape formed by edges which converge inclinedly and the spacing of which at the narrow end of said clip guide is less than the spacing of said holding elements and at the wider end substantially corresponds to the band width.

12. Apparatus according to claim 8 wherein said deformation means comprises a ram member and a die between which said band is passed, said ram member comprising at its head a wheel which can be rolled against the band, and wherein said die contains said groove which is open towards the band and whose edges which come into contact with said band are parallel to the direction of movement of said band and inclined relative to the plane of said band and converge away from the plane of said band.

13. Apparatus according to claim 8 wherein said deformation means comprises a gripper with at least two gripping claws having surfaces which engage opposite edges of said band.

14. Apparatus according to claim 13 wherein said gripping claws have recesses for receiving said edges of said band.

15. Apparatus according to claim 13 wherein said surfaces of said gripping claws which come into contact with said edges of said band extend at least in part inclinedly relative to the plane of said band in such a way that upon contact with said surfaces said edges of said band are moved towards a feed side of said holding clips.

16. Apparatus according to claim 13 wherein the path of movement of said gripping claws in the region of contact of said claws with said edges of said band has a component perpendicular to the plane of said band in a direction towards a clip feed side.

17. Apparatus according to claim 8 further comprising sensor means for detecting a connection in said band and upon said detection temporarily blocking at least one of said first signal means and said deformation means, whereby said band in the region of said connection is not deformed.

18. Apparatus for fixing a plurality of interconnecting holding clips to a like number of bands comprising a like number of apparatuses as in claim 8 wherein said first signal generation means of each of said respective apparatuses are all functionally connected in series.

19. Apparatus as in claim 18 wherein said plurality of clips comprises two clips.

20. Apparatus according to claim 8 wherein at least one of said first and second signal generation means comprises an electrical switch.

21. Apparatus according to claim 8 wherein at least one of said first and second signal generation means comprises a pneumatic switch.

22. Apparatus according to claim 20 or 21 wherein said switch includes timer means to operate such switch after conclusion of a predetermined time interval.

23. Apparatus according to claim 20 wherein said switch is disposed in said groove.

* * * * *